No. 616,929. Patented Jan. 3, 1899.
J. A. JOANS.
SCREW FERRULE.
(Application filed Sept. 30, 1897.)

(No Model.)

WITNESSES
John Buckler,
Carrie C. Olsen.

INVENTOR
James A. Joans
BY
Edgar Tate & Co.
ATTORNEYS.

United States Patent Office.

JAMES A. JOANS, OF JERSEY CITY, NEW JERSEY.

SCREW-FERRULE.

SPECIFICATION forming part of Letters Patent No. 616,929, dated January 3, 1899.

Application filed September 30, 1897. Serial No. 653,606. (No model.)

*To all whom it may concern:*

Be it known that I, JAMES A. JOANS, a citizen of the United States, residing at Jersey City, in the county of Hudson and State of New Jersey, have invented a new and useful Screw-Ferrule, of which the following is a specification.

My invention relates to improvements in screw-ferrules in which the body or ferrule is cast-iron and the cap or top is brass, used in the practice of plumbing and other similar work where screw-ferrules are used, whose caps can be removed to clear a stoppage or for any other purpose requiring access to the inside of pipes or fittings to which they are attached. The usual method of doing this is to calk with oakum and lead the screw-ferrule in a hub or bell provided on the pipe or fitting, and in cases where the pipe has no hub or bell a fitting known to the trade as a "double hub" is used. Into one end the pipe is calked in, leaving a hub or bell for the reception of the screw-ferrule in the usual manner.

The object of my invention is, first, to provide a screw-ferrule so constructed that it can be used on the spigot end or end without hub or bell of a piece of pipe without using a double hub, and, second, to construct the same screw-ferrule so that it can be used in the hub of pipes and fittings. I attain this object by the construction shown in the accompanying drawings, in which—

Figure 1:
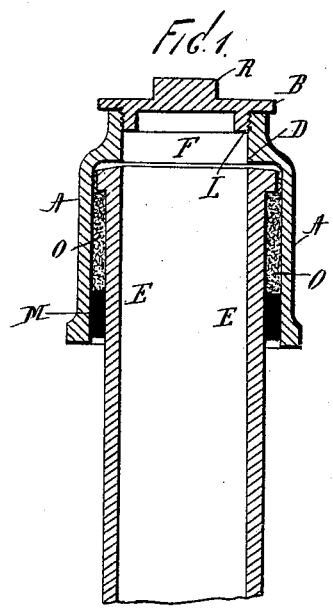
Figure 2:
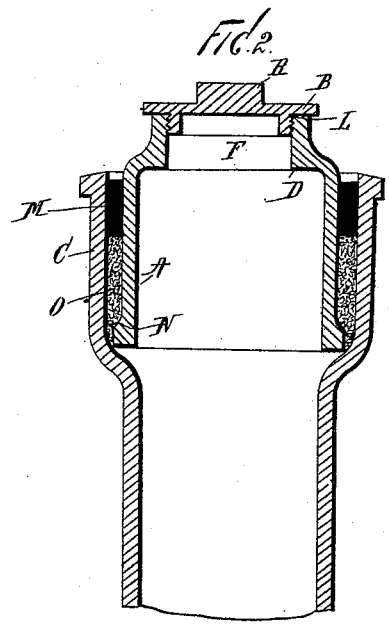
Figure 3:
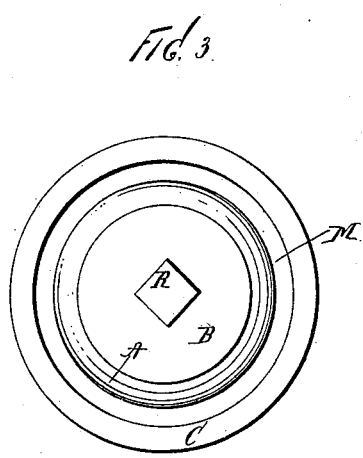
Figure 4:
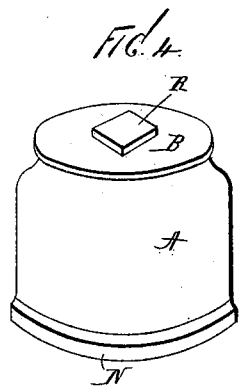

Figure 1 is a longitudinal section through one end of a pipe provided with my improved ferrule or cap; Fig. 2, a similar view showing a modified form of construction; Fig. 3, a plan or end view of the device as shown in Fig. 2, and Fig. 4 a perspective view of the improved ferrule or cap detached.

Similar letters refer to similar parts throughout the drawings.

The body or ferrule A is a cast-iron cylindrical-shaped casting reduced at one end, as shown, with an angular projection D all around the inside to answer as a seat or stop to prevent spigot end E or end without hub of a piece of pipe passing beyond this point, thus forming a hub or bell into which oakum O and lead M may be calked to secure A to E, for the purpose as specified and shown in Fig. 1. On the lower or outside edge of A is a bead or extra thickness of metal N to so strengthen this part as to prevent damage to same by an extra blow or strain. At the upper or contracted end of A is a circular opening F, whose sides are parallel to those of the body A. This opening is provided at its upper edge with a thread, as shown, to receive the brass cap or cover B, whose under surface has an annular threaded projection L to engage with threads mentioned in the aforesaid opening F.

On the upper surface of the cap or cover B is a square projection R for the reception of a wrench or key, for the purpose of unscrewing or screwing up the cap or top to make a tight joint between the same and the body, the whole constituting a screw-ferrule for the purpose as described and substantially as set forth.

I am aware that prior to my invention screw-ferrules have been made of cast-iron with brass screw caps or covers. I therefore do not claim such a combination, broadly; but What I do claim as my invention, and desire to secure by Letters Patent, is—

An improved device of the class described, for attachment to the end of a drain or other pipe, comprising a tubular ferrule having one end exteriorly contracted, which contracted portion forms an interior annular shoulder or seat, and a cap for closing said contracted end, whereby when said ferrule is mounted over the end of a pipe of less diameter the interior shoulder or seat formed by the contracted end will rest upon the end of the inclosed pipe and when the ferrule is mounted within the enlarged end of a pipe the end or edge of the ferrule opposite from its contracted end will rest upon the interior shoulder of the pipe formed by its enlarged end, the ferrule being thus adapted for convertible use either over or in the ends of drain or other pipes, substantially as and for the purpose set forth.

JAMES A. JOANS.

Witnesses:
JOSEPH TETLOW,
EVAN J. DUDLEY.